United States Patent [19]

Hirano et al.

[11] 4,225,932
[45] Sep. 30, 1980

[54] INSTRUCTIONAL CALCULATOR

[75] Inventors: Reiji Hirano, Yokohama; Koichi Mochizuki, Tokyo; Tokio Yasui, Tokyo; Jyoji Shimazu, Tokyo, all of Japan

[73] Assignee: Canon Kabushiki Kaisha, Tokyo, Japan

[21] Appl. No.: 952,054

[22] Filed: Oct. 17, 1978

Related U.S. Application Data

[63] Continuation of Ser. No. 755,593, Dec. 30, 1976, abandoned.

[30] Foreign Application Priority Data

| Jan. 20, 1976 [JP] | Japan | 51-5193 |
| Feb. 5, 1976 [JP] | Japan | 51-11687 |
| Apr. 26, 1976 [JP] | Japan | 51-47510 |

[51] Int. Cl.² .................... G06F 15/20; G09B 19/02
[52] U.S. Cl. ...................... 364/710; 35/31 R; 364/419
[58] Field of Search ............... 364/710, 419; 35/31 R

[56] References Cited

U.S. PATENT DOCUMENTS

| 3,787,988 | 1/1974 | Nakajima et al. | 35/31 R |
| 3,971,924 | 7/1976 | Ozawa et al. | 364/710 |
| 4,016,411 | 5/1977 | Genin | 364/710 X |

*Primary Examiner*—David H. Malzahn
*Attorney, Agent, or Firm*—Fitzpatrick, Cella, Harper & Scinto

[57] ABSTRACT

An electronic calculator is provided with an input keyboard for receiving numerical data, a storage interconnected to the keyboard for storing the received numerical data, processing circuitry interconnected to the storage for processing the numerical data, a display for displaying steps of the arithmetic process of the numerical data, and a visualizing unit for visualizing the numerical data in response to the display. Each step of the arithmetic process of the data may be indicated in the display in response to instructions provided on the keyboard.

22 Claims, 15 Drawing Figures

| KEY TOUCHING SEQUENCE | DISPLAY |
|---|---|
| C | 0. |
| 1 | 1. |
| 2 | 12. |
| 3 | 123. |
| × | 123. |
| 2 | 2 |
| 4 | 4. |
| = | 2962. |

|  |  |
|---:|---:|
| 2.4 | (1) |
| × 12.3 | (2) |
| 7 2 | (3) |
| 48 | (4) |
| 24 | (5) |
| 29.52 | (6) |

| KEY TOUCHING SEQUENCE | DISPLAY | |
|---|---|---|
| 2 . 4 | 2.4 | (1) |
| X | 2.4 | (2) |
| 1 2 . 3 | 12.3 | (3) |
| = or STEP | • 0.7 2 | (4) |
| = or STEP | • 4.8 | (5) |
| = or STEP | • 24. | (6) |
| = or STEP | ○ 29.52 | (7) |

| | |
|---|---|
| 72 | (1) |
| 72. | (2) |
| 4.80 | (3) |
| 4 8 0 | (4) |
| 48 | (5) |
| 4 8 | (6) |

FIG. 15    $123000 \div 7 = 17571.4 \cdots\cdots$ REMAINDER 2

| OPERATIONS | DISPLAY | DATA | QUOTIENT | REMAINDER | END |
|---|---|---|---|---|---|
| 123000 | | 123000 | | | |
| ÷ 7 | | 123000 | | | |
| QUOTIENT | | 7 | ○ | | |
| REMAINDER | | 1 | | ○ | |
| QUOTIENT | | 53000 | ○ | | |
| QUOTIENT | | 17 | ○ | | |
| QUOTIENT | | 175 | ○ | | |
| REMAINDER | | 1757 | | ○ | |
| QUOTIENT | | 10 | ○ | | |
| QUOTIENT | | 17571 | ○ | | ○ |
| REMAINDER | | 17571.4 | | ○ | ○ |
| | | 0.2 | | | |

NORMAL STUDYING

INSTRUCTIONAL CALCULATOR

This is a continuation, of application Ser. No. 755,593 filed Dec. 30, 1976, now abandoned.

BACKGROUND OF THE INVENTION a. Field of the Invention

The present invention relates to an electronic calculator particularly suitable for educational purposes.

b. Description of Prior Art

Conventional types of portable electronic calculators have been intended for arithmetical results to be obtainable by any one, even a child or unskilled person, through simple operations for arithmetical calculations such as addition, subtraction, multiplication, division, etc.

Figure 1:
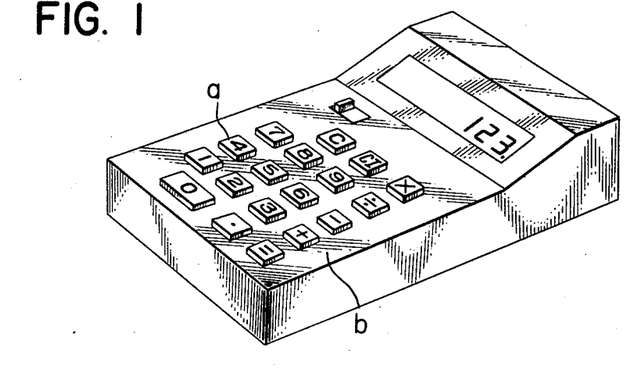
FIG. 1 is a perspective view of an example of a conventional calculator.

FIG. 1 is a perspective illustration of a small-sized electronic calculator, wherein a refers to the conventional numerical key group which inputs digits 0–9 and decimal points, while b refers to the conventional function key group which provides instructions and directions for execution thereof. By actuating said function key group b, the four arithmetical operations, etc., are executable on the operators and operands which have been inputted by depressing the relevant keys of the numerical key group a.

For instance, if one operates the calculator to calculate 123×24, the keying procedure as illustrated below is required.

[1]—[2]—[3]—[×]—[2]—[4]—[=]

Figure 2:
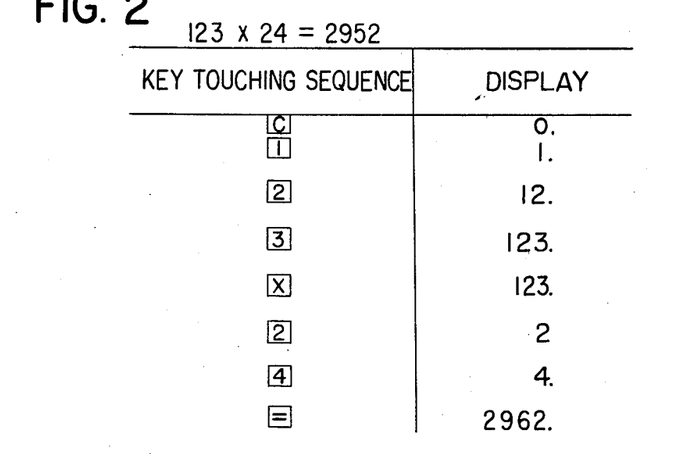
FIG. 2 is the table describing the operation of the calculator shown in FIG. 1.

Through this keying procedure, the arithmetic result for the imparted numerical numbers is displayed in the display unit as shown in FIG. 2.

Accordingly, the results of calculation are obtained by so-called one-touch, or reduced, operations, which means, however, that the calculation processes i.e., details of the calculation methods, are not understandable, and therefore these conventional types of calculators are not desirable for primary and junior high school pupils from the educational point of view.

SUMMARY OF THE INVENTION

The present invention is directed to providing a small-sized educational electronic calculator which is effective in education, by removing the educational demerits described above.

Another object of the present invention is to provide an educational desk-top electronic calculator which imparts to pupils the facility to comprehend the fundamental principles of multiplication, division and the other arithmetic operations, by not displaying the final products or quotients until the key [=] has been depressed twice or more times and by displaying in succession the partial products, partial quotients, remainders, etc., still under processing.

A further object of the present invention is to provide a small-sized electronic calculator which incorporates a means for processing at least one digit of an operator which consists of a number of digits and the operand, which have been imputted to the calculator.

Yet a further object of the present invention is to provide a small-sized educational calculator with superior educational effects for studying division processes.

Other objects of the present invention will become apparent from the embodiments described hereinafter with reference to the accompanying drawings.

DESCRIPTION OF THE PREFERRED EMBODIMENTS

Figure 3:
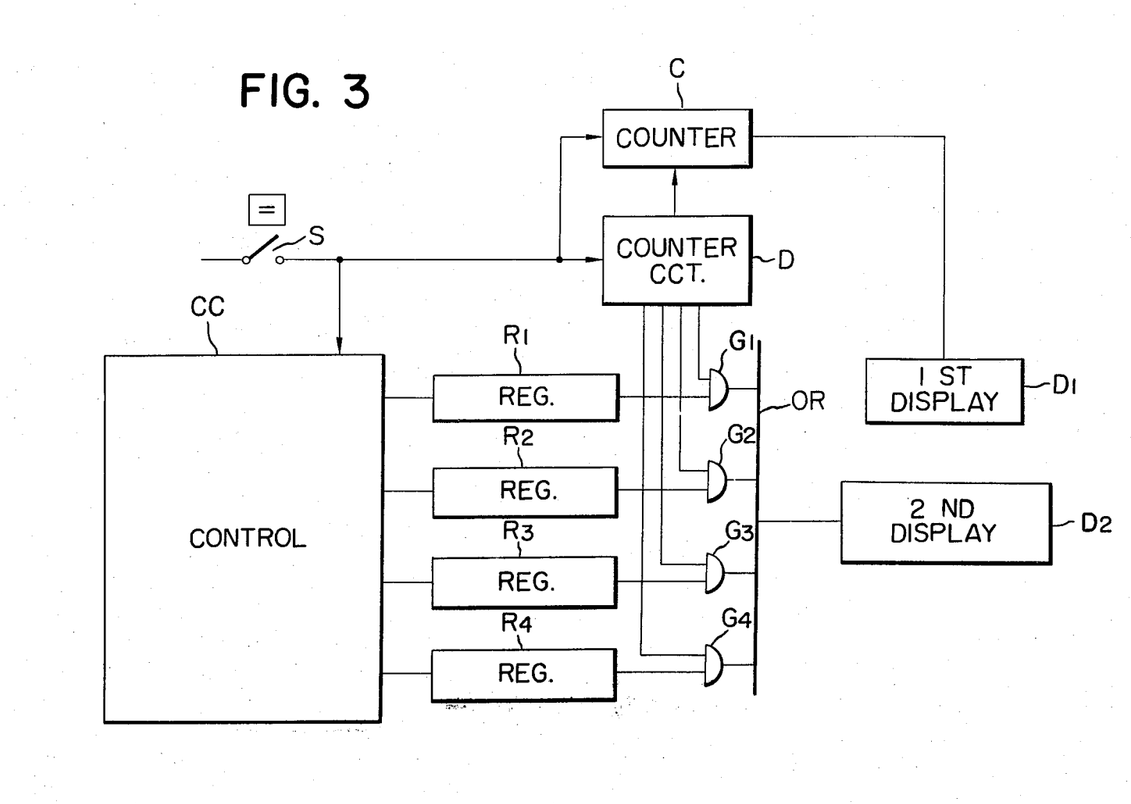
FIG. 3 is a block diagram showing an embodiment of the present invention.

FIG. 3 is a block diagram of an embodiment of the electronic calculator enabling pupils to understand the principle of multiplication. S is the keyboard switch which is closed by depressing the key [=]. The numerical keys and the function key switches ×, ÷, +, − are thereby omitted. CC is the control circuit for controlling the various operations of the electronic calculator. D is the counter circuit provided with a counter for counting the number of depressions of the key [=], the decoder for decoding the counted signals etc. C is a counter in which each depressing of the key [=] results in successive subtractions of 1 from the preset number of digits of the multiplier during the time interval from depressing the key [×] until depressing the key [=]. D1 is the first display unit displaying the contents of said counter C and advising the number of depressions of the key [=] required until the final product is obtained. D2 is the second display unit which successively displays the contents of the registers R1-R4. G1-G4 are AND-gates and OR is an OR-gate. Now the multiplication 4321×123 is illustrated below as an example of the operation.

An ordinary input of the multiplicand [4] [3] [2] [1]×the multiplier [1] [2] [3] will be keyed into the control circuit and, by depressing the key [=], the digit 3 will be stored in the subtraction counter C when the multiplier comprises 3 digits. This multiplication would usually be written down in the following manner if calculated on paper.

```
    4 3 2 1
×     1 2 3
  ─────────
    1 2 9 6 3
      8 6 4 2
    4 3 2 1
  ─────────
  5 3 1 4 8 3
```

Consequently, as the partial products corresponding to each digit of the multiplier are 12963, 8642 and 4321 respectively while the final product or answer is 531483, each of such results will be stored in the corresponding registers R1–R4 as shown in the drawing. These partial products, which are always obtained on the way to reaching the final product, are easy to calculate with ordinary or desk-top type calculators as well as to store in the registers R1–R4. The initial depression of the key [=] therefore causes each of said products to be stored in the respective registers R1–R4 and the digit 3 to be displayed in the first display unit. The initial depression of the key [=] will then be counted as 1 in the counter circuit D and decoding thereof will ensue. As a result the AND-gate G-1 is enabled and the second display unit displays 12963, i.e., the first partial product, 4321×3, obtained from the register R1. Another depression of the key [=] causes the counter D to count 2 and decoding thereof will ensue. Further AND-gate G-1 is disabled and AND-gate G2 enabled so that the second partial product 8642 will be obtained from the register R2 and displayed. On the subtraction counter C, 1 is subtracted from 3, and the difference 2 is displayed on the first display panel, which indicates that the final product is obtainable by depressing the key [=] two more times. In the same manner, the third depressing of the key [=] causes the second display unit to display the third partial product 4321 which is the contents of the register R3, and the first display unit displays 1. The fourth, or final depressing of the key [=] causes the second display unit to display the final product 531483 which is the contents of the register R4 and the first display unit indicates 0 which means the entire process is completed.

As mentioned above, this embodiment provides the pupils with smooth comprehension of the principles of multiplication through successive recognition of the partial products by each depressing of the key [=]. Furthermore, the ease of detecting miscalculations in one's own multiplication on paper provides a highly appropriate teaching machine for checking purposes. In division as well, the successive displays of the partial and the final quotients together with the remainders for the respective partial and final quotients bring ready comprehension of the principles of division. Namely, in the figure, the first partial quotient and the first remainder, etc., are respectively stored in the registers R1 and R2, so that the final quotient may be stored in the final register and the necessary number of registers are so provided that the final quotient is stored in the final register. It is also advisable to provide a special key [REMAINDER] so that the first and the second remainders, etc., the registers R2, R4, etc. are received by the display unit.

Besides this example, various modifications, such as successive illumination of the lamps, are readily available for the first display unit. Otherwise, it may also be advisable for instance simply to vary the coloration of the second display panel without any particular provision. Namely, for example, green is used for the partial quotients, yellow for the remainders, red for the final quotients, etc., are practically possible by employing multicolored liquid crystals, etc.

It is also possible to provide a special key so as to avoid depressing the key [=] twice or more times and other various modifications are readily available.

Figure 4:
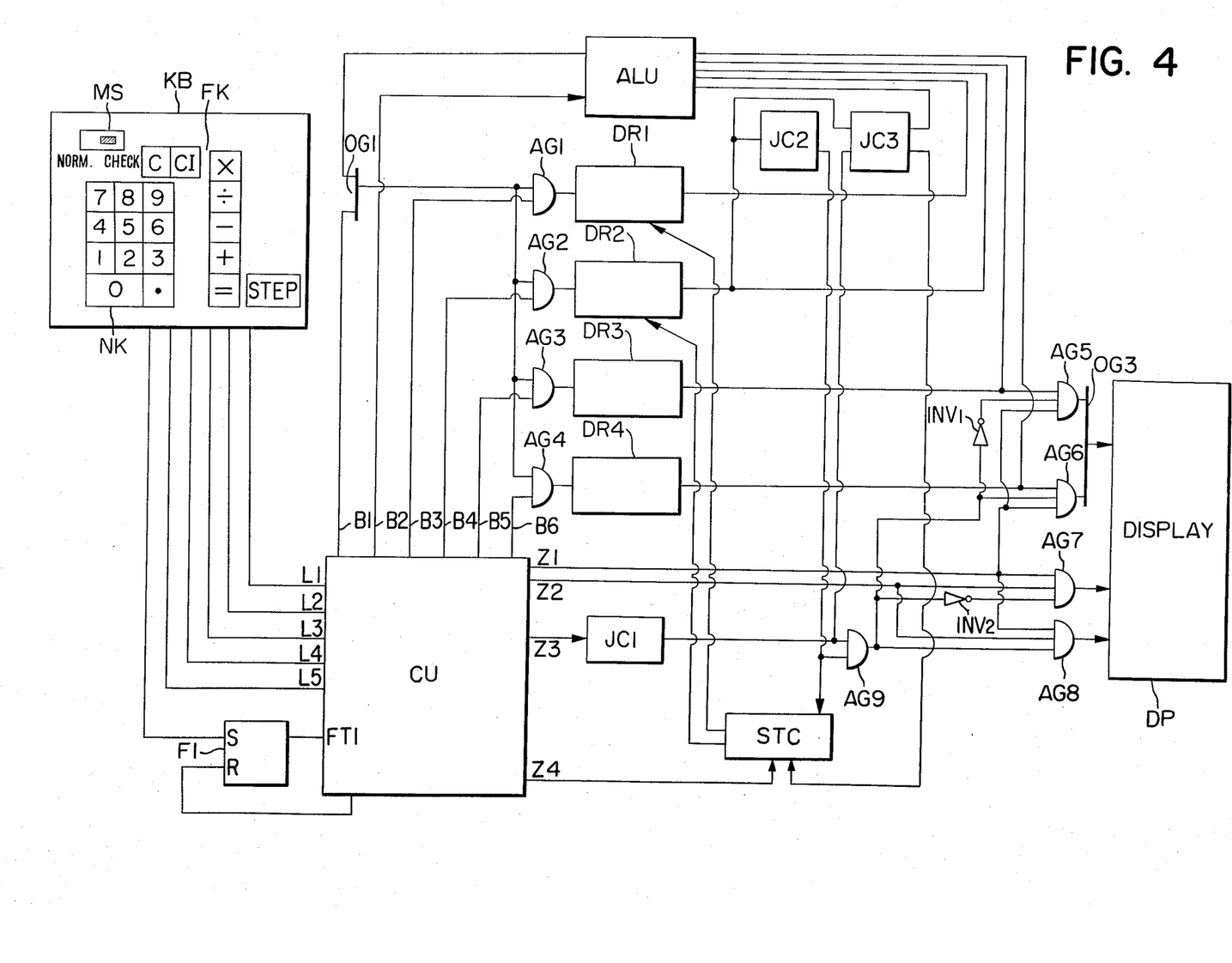
FIG. 4 is a block diagram illustrating a small-sized electronic calculator which is another embodiment of the present invention.

FIG. 4 is a block diagram illustrating a small-sized electronic calculator which is another embodiment of the present invention.

The keyboard KB is provided with two or more operational keys, NK being a group of keys consisting of the keys and others which provide the calculator with the input of numerals 0–9 and the decimal points, FK being a group of function keys and others which provide the calculator with the instructions of the four arithmetic operations and the directions for executing these commands as well as of clearing the storage, MS being a mode change key which causes the calculator to execute the various modes of operations, STEP being a key which causes the said calculator to execute the separate processing of the input data.

CU is the control circuit which outputs various control signals in response to accepting key signals from the keyboard KB or detecting the state of other circuits in the calculator. For instance, the input signals of the keyboard KB are developed from the terminals L1, L2, L3, L4, L5 and the code signals of the numerical key NK are sent out from the terminal B1. The terminal B2 outputs signals controlling the arithmetic circuit ALU and the terminals B3, B4, B5, B6 output the signals which enable or disable the gates inputting into the registers. FT is the terminal for detecting the state of the flag F1 set by the mode change key MS. Z1 is the terminal for generating the signals for display control, and Z2 is the terminal for producing the signals when the flag F1 is set. Z3 is the terminal which outputs to the discriminator circuit JC1 the signals representing whether the execution key for operation has been depressed or not. Z4 is the terminal for generating a signal when the operations are finalized.

DR1 is a register whose input is the signals from the numerical keys NK on the keyboard KB by way of the control circuit CU as well as of AND-gate AG1, which is controlled by OR-gate OG1 and the signals from the terminal B3 of the control circuit CU.

DR2 is a register to which digits are received in response to the signals from the terminal B4 of the control circuit CU.

DR3 is a register to which digits are received in response to the signals from the terminal B5 of the control circuit CU, in other words, as described later in the case of multiplication with the results of multiplication.

DR4 is a register whose input is the partial product, that is, the result of the multiplication between the multiplicant and a digit of the multiplier.

ALU is an operational circuit which operates on the data in the registers.

JC1 is a discriminator circuit which discriminates whether the operational execution keys have been actuated or not.

JC2 is a discriminator circuit which discriminates whether the lowest digit of the register DR2 is 0 or not.

STC is a shift circuit which carries out right or left shifting of the contents in the registers DR1 and DR2.

AG5 and AG6 are AND-gates which supply the display unit DP with the data selected from the registers DR3 and DR4. AG7 and AG8 are the AND-gates whose outputs are the signals indicating whether the data on display are still being processed or not when the mode change key MS is set to its checking position. AG9 is an AND-gate which generates the on-off control signals for the abovementioned AND-gates AG5, 6, 7, 8 according to the signals from the discriminator circuits JC1 and JC2.

INV1 and INV2 are inverters, or AND-gates, which enable the one and simultaneously disable the other of the AND-gates AG5, AG7 or of the AND-gates AG6, AG8.

OG2 and OG3 are the OR-gates.

Figure 5:
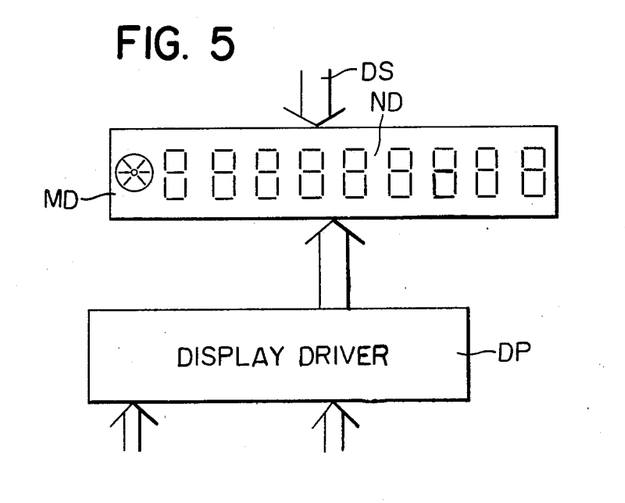
FIG. 5 is a block diagram of the display unit shown in FIG. 4.

The display unit employs the segment type as illustrated in FIG. 5, in which ND is the numerical display element and MD is the signal display element that displays the states and contents of the numerical display. Those contents thus displayed by the signal display element MD may be displayed by the numerical display element ND. Also available are matrix-type displays, etc., as display element. DD is the driving circuit for display from which the contents to be displayed are successively fed to the display element and the digit selection signal DS is sent from the other side to the display element.

An operation example will be given hereinafter and the operation of the small-sized electronic calculator of the present invention will be explained.

Figure 6:
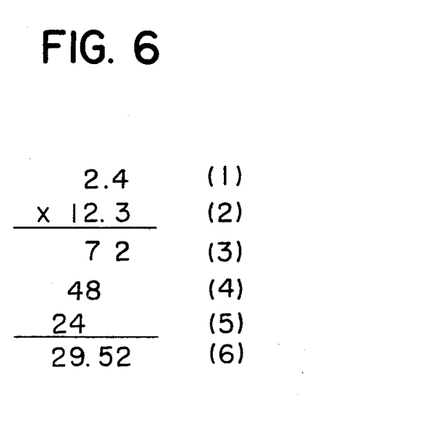
FIG. 6 is an illustration useful in understanding the embodiment shown in FIG. 4.
Figure 7:
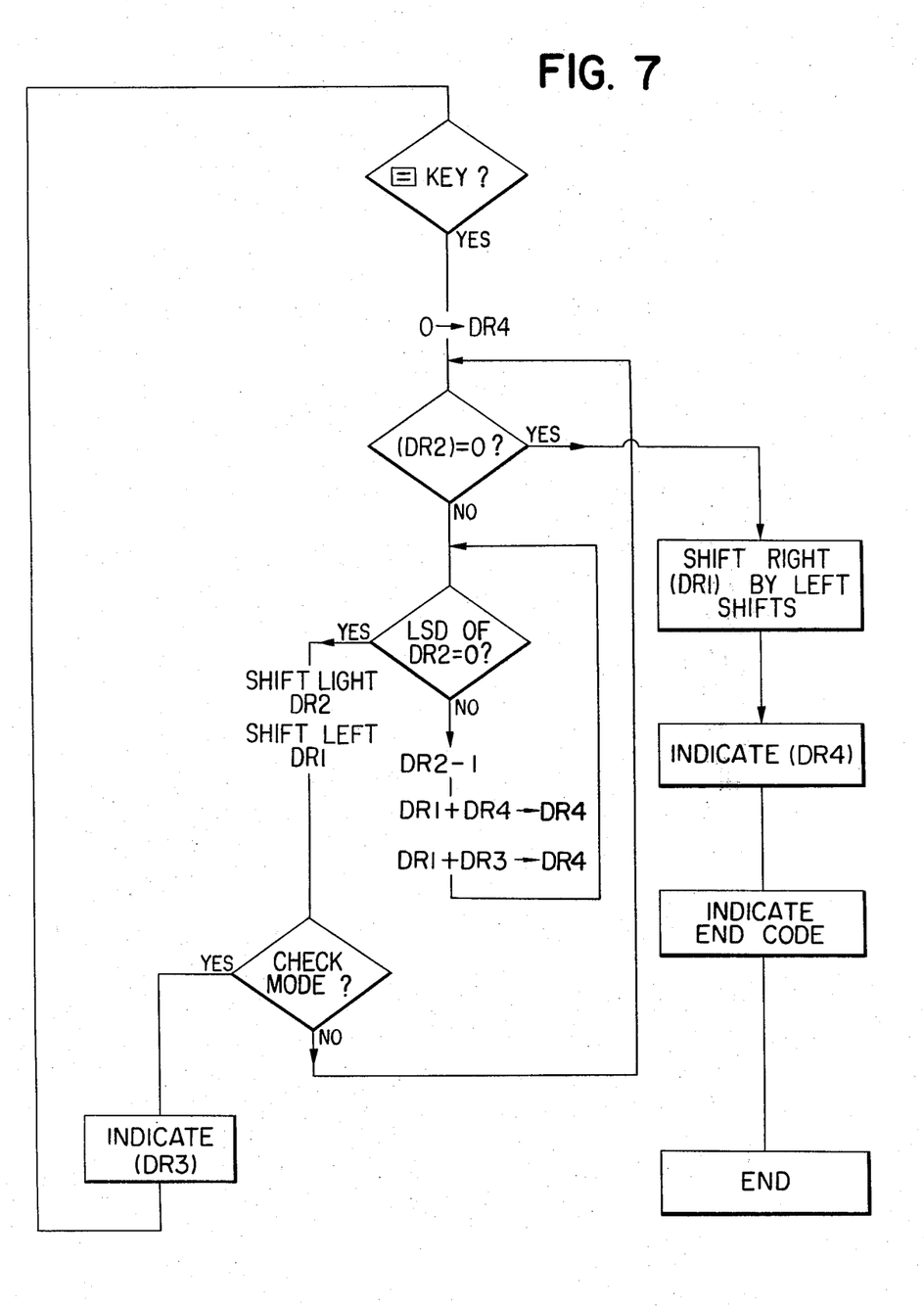
FIG. 7 is a flow chart illustrating the operation of FIG. 4.

FIG. 6 is a drawing which illustrates a calculation example for explaining said operation and FIG. 7 is a diagram explaining the control function for the block diagram of FIG. 4. The following descriptions are given with reference to FIGS. 4 and 7. In the first place, the mode change switch MS is switched to its checking position.

As is the case with conventional calculators, the input data 2·4 of the multiplicand and 12·3 of the multiplier shown in FIG. 6 are received by the keyboard KB, and memorized in the prescribed registers. In this case, the multiplicand data 2·4 is stored in the register DR1 while the multiplier data 12·3 is stored in the register DR2. When the numerical data to be processed is received and the key [=] is depressed, the control unit CU detects the actuation of the key [=] and provides the output signal which causes the register DR4 to be cleared. Next, the discriminator circuit, JC2, which discriminates whether or not the contents of the register DR2 is 0, is actuated to discriminate the contents of the register DR2. If the discrimination does not result in 0, the discriminator circuit JC3 is actuated to discriminate whether the lowest digit LSD of the register DR2 is 0 or not. As the result obtained is not 0, the contents of the register DR2 through addition are transferred to the register DR3 or DR4 according as said addition is executed to the contents of the register DR3 or DR4 (which are currently 0) and such process will successively be continued until the least significant digit in the register DR2 becomes 0 and the multiplication is finalized for the multiplicand and a digit of the multiplier. The shift circuit STC is actuated by the output of the discriminator circuit JC3 which discriminates whether the least significant digit in the register DR2 is 0 or not, and a right shift will be carried out in the register DR2 of which the contents become 12, while a left shift will be made in the register DR1 of which the contents become 240.

Figure 8:
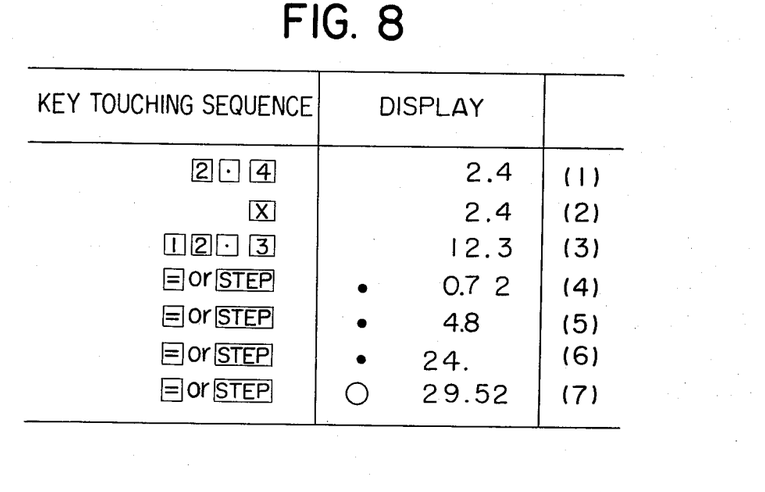
FIG. 8 is an illustration useful in understanding the operation of the embodiment.

In the next place, the setting state of the flag FI and the operation of the execution key are discriminated by the discriminator circuit JC1, and in order that the contents of the register DR4 may be displayed on the display unit DP, a specific signal is sent via AND-gate AG9 so as to enable AND-gate AG6 so that the contents of the register DR4 may be displayed as shown in (4) of FIG. 8. The output of AND-gate AG8 makes a dot display by the display element MD as illustrated.

Further pressing of the operational execution key will cause the control circuit to clear the contents of the register DR4, and detection is made on the contents of the register DR2, wherein the content of the lowest digit position of the register DR2 is detected provided that not all the digits are 0 (zero). Such being the present case, the operation of 2·4×2 will be executed. Namely, multiplication is initiated on the data 2·4, on which a left shift has been carried out, and on the data "2" which is being stored in the lowest position through a right shift. First, the contents of the register DR1 are added to the partial resultant data in the register DR3, and the resultant of said addition is provided to the register DR3. Second, the addition of the data in the register DR1 to the data in the register DR4 (which has been cleared to 0) is carried out and the resultant of said addition is supplied to the register DR4. Such a series of operations will be repeated until the contents in the lowest position of the register DR2 become 0, so that the multiplication is executed on the multiplicand and two digits of the multiplier. Consequently, the partial product of the second digit alone is stored into the register DR4 while the sum of the partial products of the first and the second digits is transferred to the register DR3, and thence the least significant digit 0 of the register DR2 will be discriminated by the discriminator circuit JC3. If the digit is 0, a right or left shift will be carried out on the contents of the register DR2 or DR1, respectively, so that the contents of the register DR4 are sent, as previously stated, to the display unit DP and displayed as illustrated in (5) of FIG. 8, because the mode change key MS has been set to its CHECK position. On such occasions, the fact that the displayed contents are the partial resultant is displayable for example by the dot mark on the signal display element MD, as shown in the figure, with the outputs from the terminal Z2 of the control circuit and the AND-gate AG7 when the display control signal is developed from the terminal Z1.

The above operation will be repeated each time the execution key is pressed and, when the entire contents of the register DR2 become 0, the end signal of the operation on the output from the discriminator circuit JC2 and the control circuit CU will be impressed to the shift circuit STC, the output of which is the signal to repeat the right shift the same number of times as the left shift already carried out on the contents of the register DR1 so that the contents of the register DR1 may return to the state of the input from the keyboard KB. Besides, the output of the discriminator circuit JC2 opens AND-gate AG9, and such opening signals enable AND-gates AG8 and AG7 which drive the display element MD to display the conclusion of the multiplication, and at the same time the output of AND-gate AG9 enables AND-gate AG5 so that the data 2·4×12·3 stored in the register DR3 may be sent through the OR-gate OG3 to the display unit DP, on which the data, etc., are displayed as is shown in (7) of FIG. 8. In the above description, the arithmetic execution key was functionally changed by the mode change key MS. Accordingly, if the mode change key is omitted, it is advisable to incorporate the step key STEP so that the above operation may be executed with discriminator circuit JC1 to discriminate the action of such a key.

Figure 9:
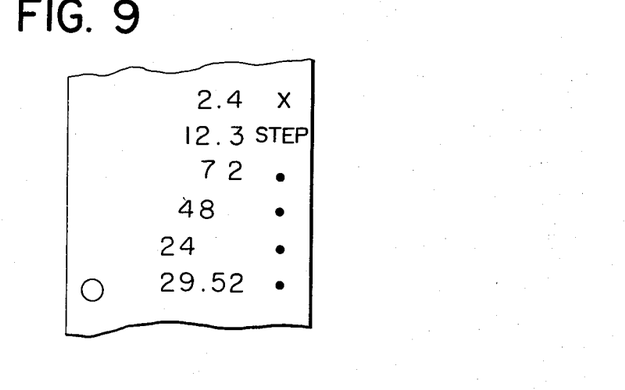
FIG. 9 is an illustration showing another example of the output.

FIG. 9 illustrates an example of the data display by a printer, which can readily be obtained if display unit illustrated in the block diagram of FIG. 4 is replaced by a printer.

Figure 10:
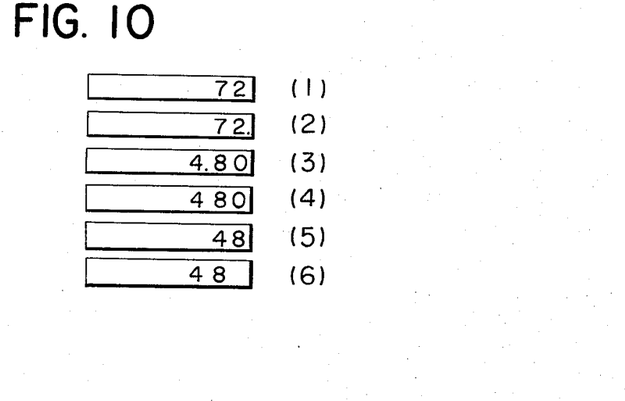
FIG. 10 is an illustration showing another example of display.

FIG. 10 illustrates the display of the unfinished result, where (1) is an example of the numerical display with the decimal point suppressed in displaying a partial result such as (3) of FIG. 6, which is readily realized by the block diagram of FIG. 4; (2) is an example of the usual display in the numerical registration; (3) illustrates the display of a partial result as shown by (4) of FIG. 6, wherein a one-digit shift has been carried out on the previous result and the decimal point is illuminated. Such examples of display are readily realizable according to the description of the embodiment; (4) illustrates the case where the display of the decimal point is suppressed in the above example, wherein it can be seen that such a display is readily realizable by carrying out the left shift in the register DR1 while (5) illustrates the display from the right side of the data obtained by the operation, which is realizable by driving the shift circuit STC so as to carry out a right shift of the contents of the register DR4 with the end signal of the arithmetic operation in progress; (6) is designed to zero-suppress the contents of those digit position lower than the effective digit in the data display of (4), which may also be realized by zero-suppression using the output of the means provided for memorizing the number of times of right shifting of the contents of the register DR1.

As mentioned above in detail, the present invention is very effective educationally as the arithmetic process is understandable by means of the display of the partial results of operation.

Figure 11:
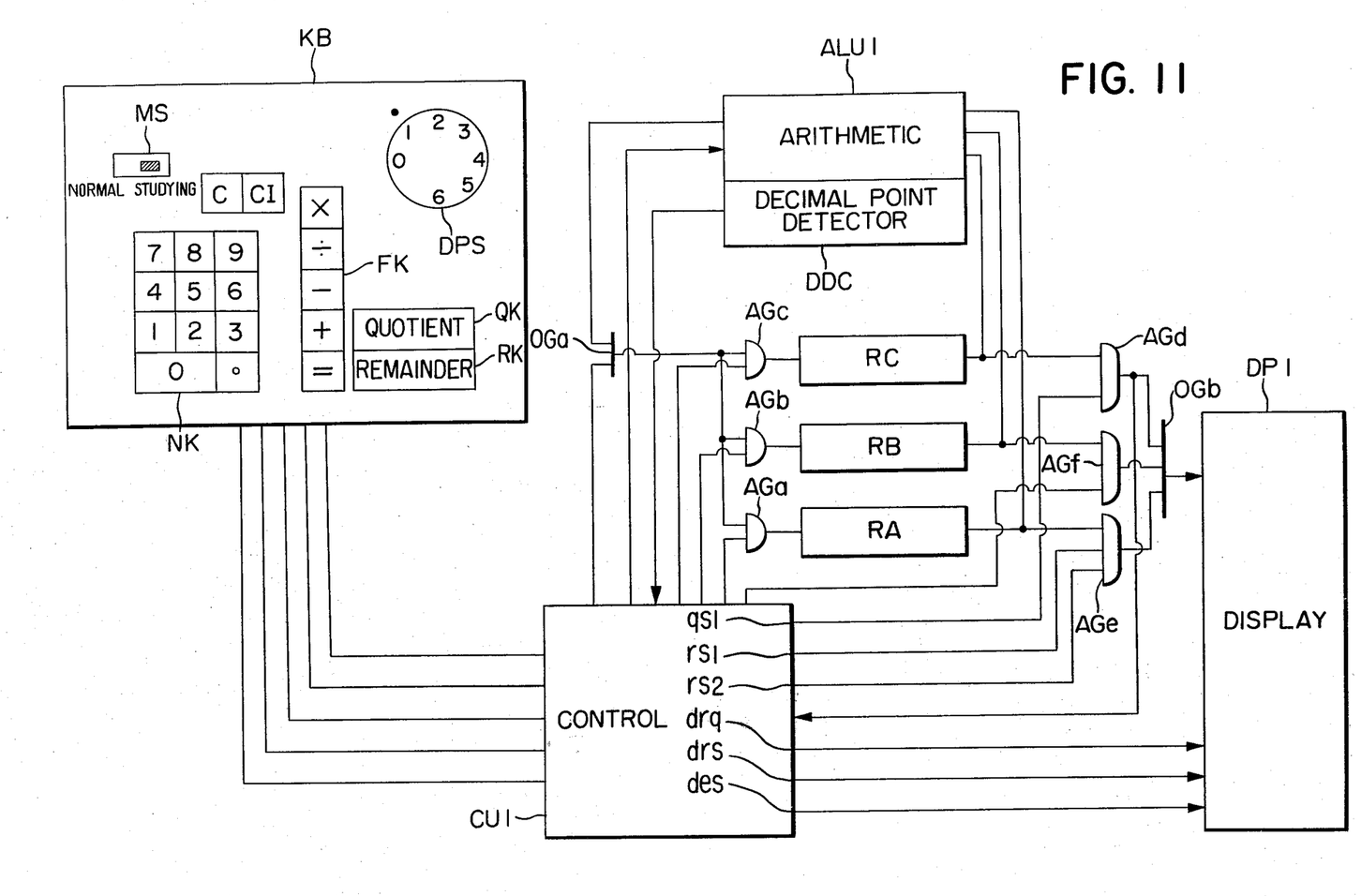
FIG. 11 is the block diagram of an alternative small-sized electronic calculator embodying the present invention.

FIG. 11 is a block diagram illustrating another embodiment of the small-sized electronic calculator related to the present invention.

KB is the keyboard-type input unit which inputs data into the calculator and incorporates, for instance, as the figure shows, the numerical key group NK to input 0-9 and the decimal point, the function key group FK to give instructions for the four arithmetic operations, the execution of instructions and clearing the memory contents, the mode change switch MS for the purpose of changing the mode of operation, the quotient key QK employed in division, the remainder key RK, and the decimal point setting dial DPS.

The control circuit CU1 will detect the operation of the keys on the keyboard-type input unit KB and output the numerical signal corresponding to the key as well as the control signal; further, CU1 outputs other control signals as a result of the detection of the state of other circuits.

Figures 12, 13:
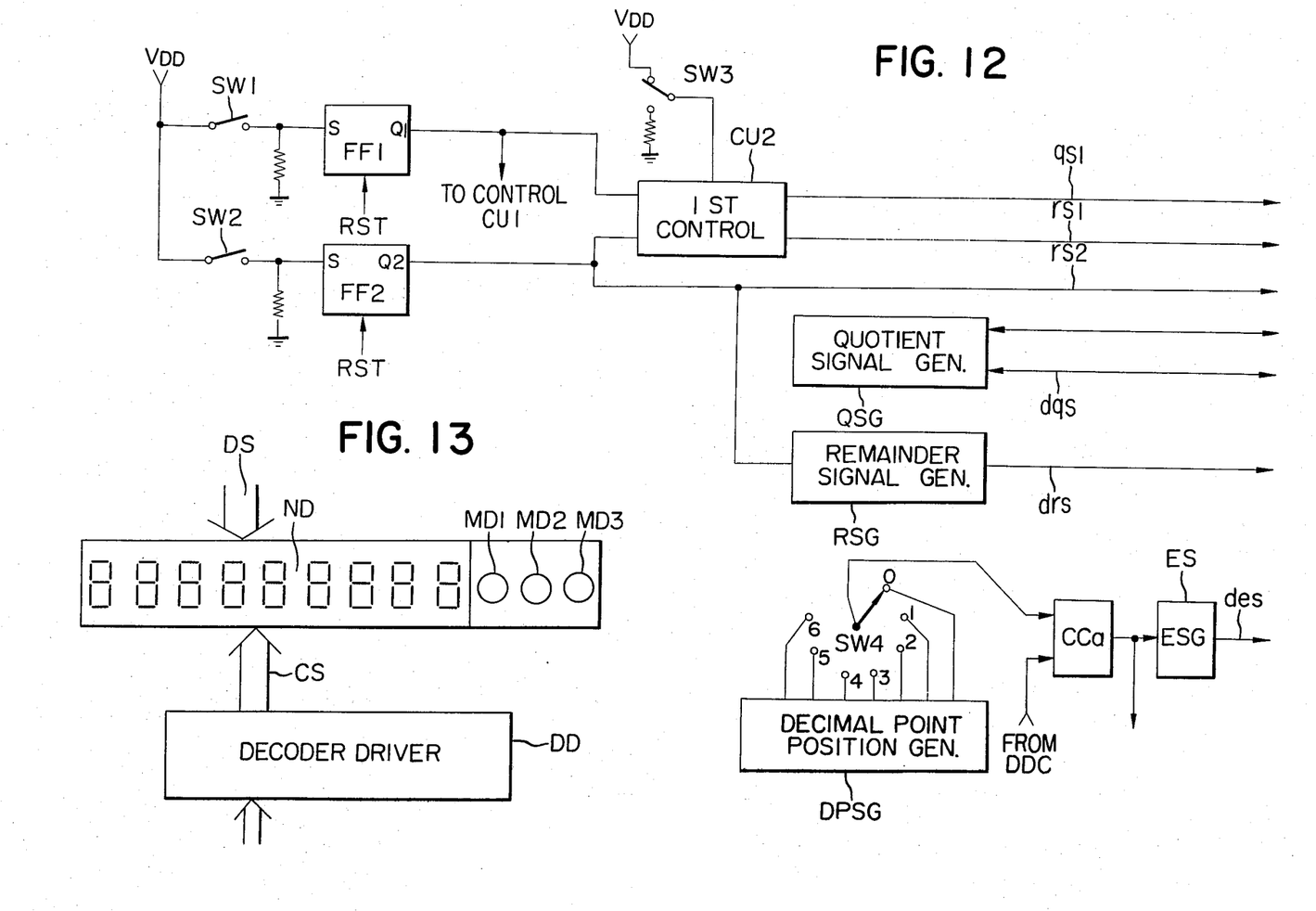
FIG. 12 is the block diagram showing further details of the control section, in accordance with the present invention, of the control circuit CU shown in FIG. 11.
FIG. 13 is an illustration of the construction of the display element included in the display unit DP.

FIG. 12 is a block diagram describing the display control unit of the control circuit CU1 in FIG. 11. In this diagram, SW1 is a switch which is actuated by the operation of the quotient key QK and SW2 is a switch which is actuated by the operation of the remainder key RK. The switches SW1 or SW2 will set the flip-flop FF1 or FF2 respectively. SW3 is the switch which causes the calculator to discriminate between two different states according to the operation of the change-over switch MS in FIG. 11. The first control circuit CU2 will be given an instruction as to whether to operate in the study mode when the voltage $V_{DD}$ is applied to the first control circuit CU2, as illustrated, by operating the switch SW3, or in the ordinary calculator mode in the reverse case.

Further, the outputs Q1, Q2 of the flip-flops FF1, FF2 are applied to the first control circuit CU2, of which the output signal permits the AND-gates AGd, AGe to be enabled or disabled. The output of the flip-flop FF2 is also sent to the remainder signal generator circuit RSG, and supplies the display panel with the output of the remainder signal generator circuit RSG.

QSG is the quotient signal generator circuit which detects the contents of the register C obtained via AND-gate AGd and applies the quotient signal to the display panel DP1.

DPSG is the decimal-point position signal generator the input of which is the information on the decimal point set by the decimal point dial and the output of which is sent through the switch SW4 of the decimal point dial DPS to the coincidence circuit CCa, wherein comparison is made with the output of the decimal point detector circuit DDC. When the output is obtained from said coincidence circuit CCa, the end signal generator ESG will send the end signal des to the display unit DP1, so as to illuminate the display element which will be described later. The OR-gate OGa will, via the control circuit CU1, apply to the AND-gates AGa, AGb, AGc the code signals corresponding to each key of the numerical key group NK in the key input unit KB, and the numerical data passing through the arithmetic operation circuit ALUa are applied to the input end of AND-gates AGa, AGb, AGc and inputted into one of the registers $R_A$, $R_B$, $R_C$ through the AND-gate opened by the control signal from the control circuit CU1.

The outputs from each of the above registers $R_A$, $R_B$, $R_C$ are sent to the arithmetic operation circuit ALUa and are inputted into the registers $R_A$, $R_B$, $R_C$ after discrimination of the data from the registers by the well-known means of gate control under the control of the control circuit CU1, and processing in the adder-subtractor (not shown in the diagram).

The AND-gates AGd, AGe are gates which provide the display unit DP with the contents of the registers RC, RA and the signal qS1 of the first control circuit CU2 is applied to the AND-gate AGd, while the signal rS1 of the first control circuit CU2 and the output signal rS2 of the flip-flop FF2 are applied to the AND-gate AGe. The data which have passed through AND-gates AGd, AGe are inputted into the display unit DP1 via OR-gate OG6 and displayed. The display element of the display unit DP1 will, as shown in FIG. 13 for example, display the numbers by the figure-8 segment ND while what these numbers represent is displayed by the display elements DD1, DD2, DD3 arranged to the right thereof. For instance, the display elements DD1, DD2 and DD3 respectively represent the quotient, the remainder and the completion of the operation.

The above-mentioned display elements ND, MD1, MD2, MD3 are displayed by the coincident drive of the digit signal DS and the data signal CS from the decoder driver DD.

The operation of the embodiment with the above or similar composition is described below with an arithmetic example such as the following:

$$123000 \div 7 =$$

First, the change-over switch MS is switched to the right, as shown in the drawing, with the signal of "H" level ($V_{DD}$) applied to the first control circuit CU2 as shown in FIG. 12, so that the calculator is instructed to enter the study mode. Second, the decimal point dial DPS is operated to set the number of digits following the decimal point that are required. For example, one digit below the decimal point is set as shown in the diagram.

Third, the numerical key group NK is operated so that the data 123000 is inputted into the register RB and sent to the display unit DP1 through the AND-gate AGf controlled by the display control signal from the control circuit CU1, which results in the display of the dividend data.

Then, when the function key FK is operated to give the instruction for division [÷], said data will be discriminated by the control circuit CU1 and memorized in a memory device, for example a flip-flop, etc., although this is not shown in the diagram.

Next, when the divisor data 7 is inputted, the dividend data will be transferred to the register RA while the divisor data will be inputted to the register RB and sent to the display unit DP1 via the AND-gate AGf and displayed, as described above.

Figure 14:
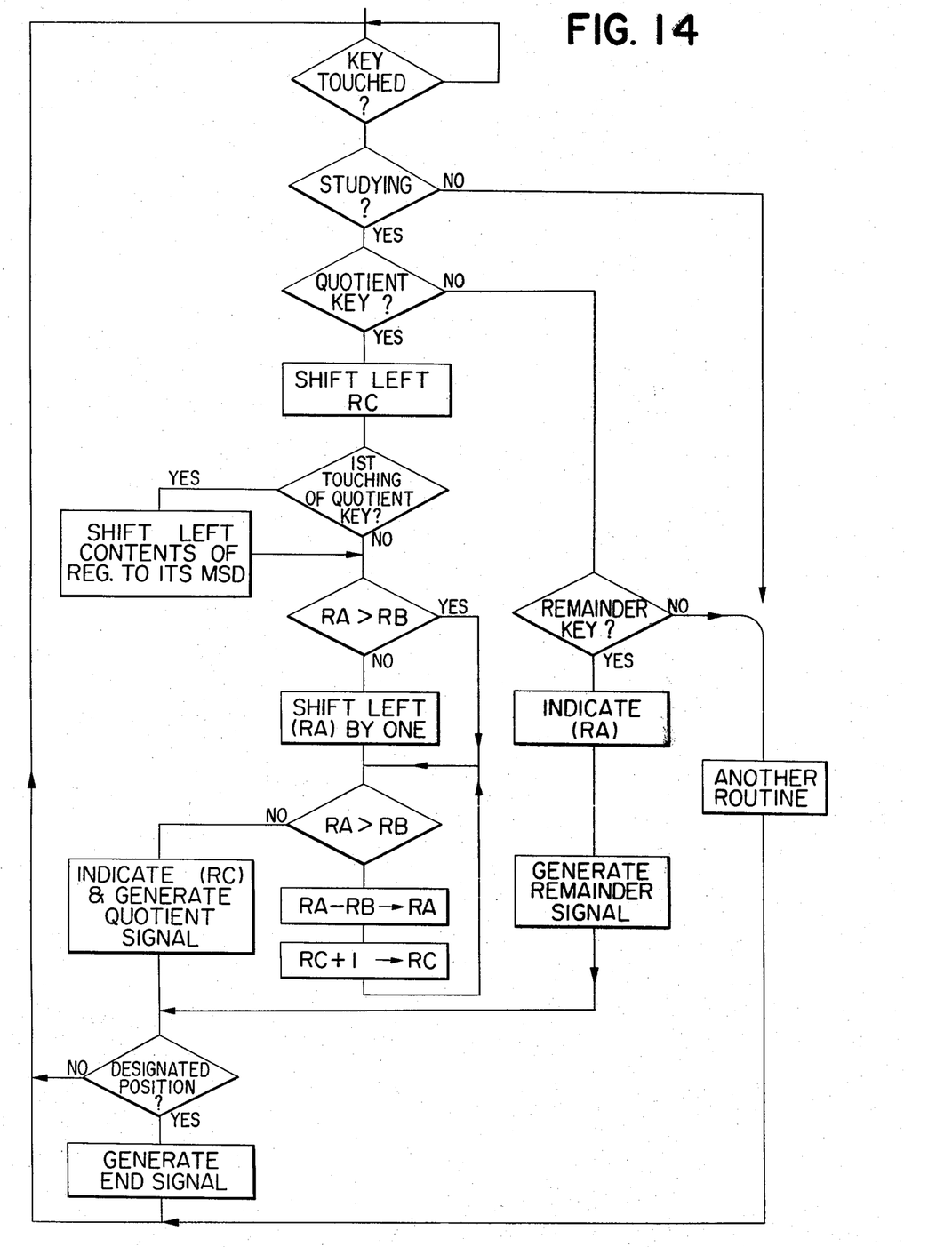
FIG. 14 is a flow chart which describes the operation of the embodiment of the present invention.

Next, once the quotient key QK has been operated, the first detection will be made as to whether the quotient key QK has been operated or not, and second, another detection will be made as to whether said operation of the quotient key QK is the first such operation or otherwise, though this is not shown in FIG. 14.

Said detection is attained by detecting the state of setting of the flip-flop, etc., by operating the quotient key QK. Consequently, if it is first such operation, a left shift will be carried out on the data from the registers $R_A$, $R_B$, and the uppermost numeral thereof will coincide with the highest digit in the register.

Next, a comparison is carried out between the data from the registers $R_A$ and $R_B$ in the arithmetic operation circuit ALU1, for example by processing $R_A - R_B \rightarrow R_A$, in order to compare the data from the registers $R_A$ and $R_B$ according as whether or not a "borrow" appears, and the numerical data after comparison will be returned to the initial state by the operation $R_A + R_B \rightarrow R_A$.

If the comparison results in $R_A < R_B$, a one-digit shift to the right is carried out on the contents of the register $R_B$. The division, which is done by repeated subtraction, is then initiated. Initially, comparison is made, as previously stated, between the data from the registers $R_A$ and $R_B$, and if it results in $R_A < R_B$, the operation $R_A - R_B \rightarrow R_A$ will be carried out in the arithmetic operation circuit ALU1, and then the addition +1 to the register RC will be carried out. The controlling procedure of the addition +1 to the register RC with said comparison between the data from the registers $R_A$ and $R_B$ will be repeated until the data from the register $R_A$ becomes less than that from the register $R_B$. When such repetition is concluded, a one-digit quotient will be obtained. Consequently, the quotient signal generator unit QSG outputs the quotient signal to the signal line dgs after receiving the "H" level signal from the flip-flop FF2 which was sent by operating the quotient key, and the display element MD1 in the display unit DP1 is actuated by said quotient signals. In the above example of display, the mark 0 is employed, but a figure-8 shape may be used so as to form particular patterns.

The "H" level output of the flip-flop FF2 is applied to AND-gate AGe through the signal line rS2 and the quotient data (currently 1), which has been stored in the register RC, is sent to the display unit DP1 and indicated by the display element ND.

Next, by setting the decimal point dial DPS, one of the output signals from the multioutput terminal of the decimal point signal generator DPSG is applied to the coincidence circuit CCa, and compared therein with the output of the decimal point counter DDC applied to another input terminal of the coincidence circuit CCa, and since the quotient data stored in the register RC still lacks the data below the decimal point, the calculator resets the flip-flop FF1 so as to return to the key sensing state.

Figure 15:
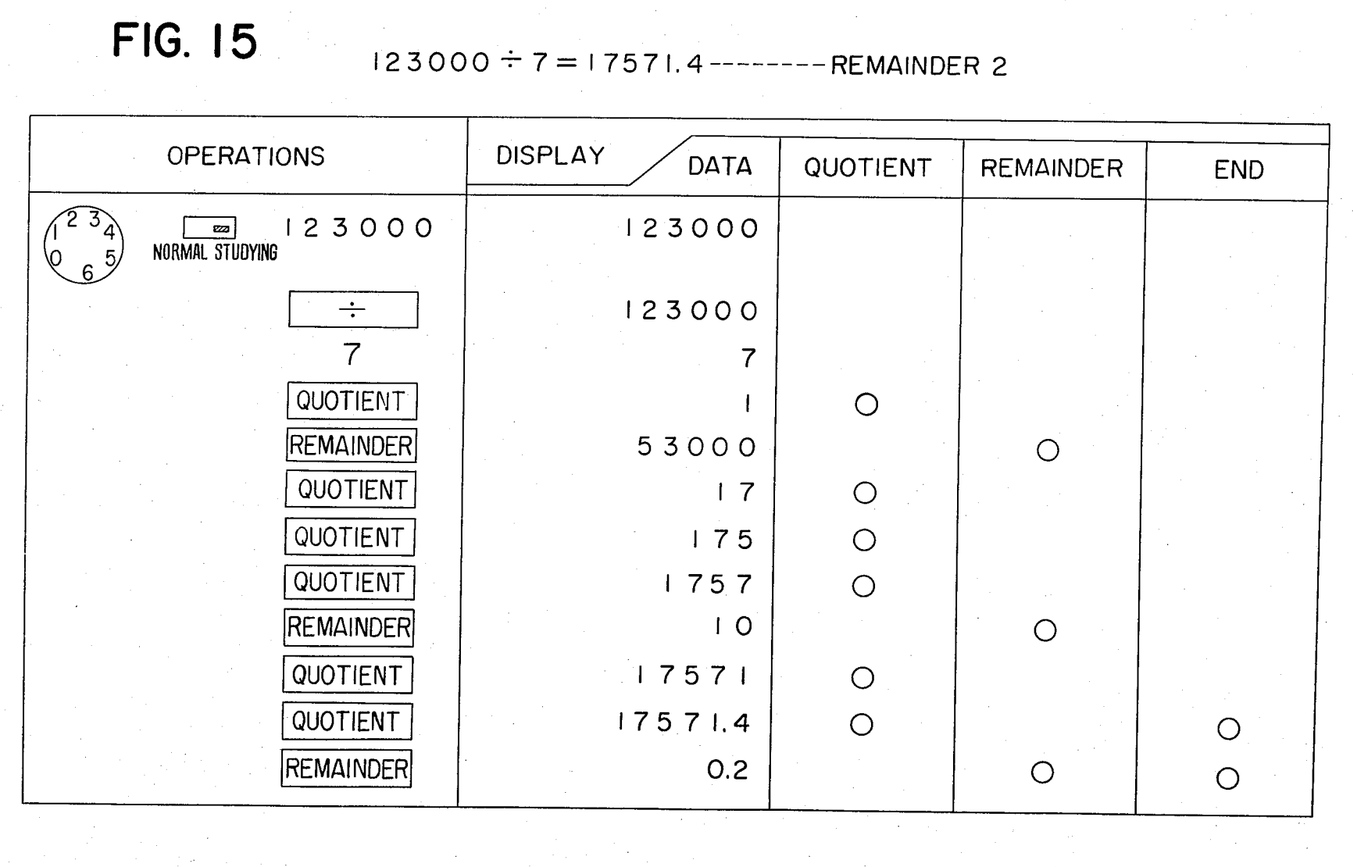
FIG. 15 is an example of the display which is given in response to the keying operation.

In the third place, when the remainder key RK is operated, the switch SW2 is closed and the flip-flop FF2 is set by application of the voltage $V_{DD}$ so that the first control circuit CU2 discriminates the operation of the remainder key RK. Then the signal for the display of the remaining data stored in the register RA is outputted from the signal line rS1 of the first control circuit CU2 and applied to an input terminal of AND-gate AGe, to which is the output of the flip-flop FF2 is also applied, so that the remainder data in the register RA is sent through AND-gate AGe to the display unit DP1 and displayed as shown in FIG. 15. Further, the output of the flip-flop FF2 is detected and the signal of the remainder signal generator circuit RSG is outputted to the signal line drs, so that the display element MD2 indicates that the digit displayed by the display element ND is the remainder.

Next, to judge the number of digits following the decimal point included in the data of the register RA, in other words, to judge whether it complies with the value set on the decimal point dial DPS, a comparison is made in the comparison circuit CC between the output of the decimal point counter DDC and the signal from the decimal point signal generator DPSG selected by the decimal point dial DPS, wherein the key sensing state will be recovered if coincidence is not attained by resetting the flip-flop FF2 by means of the controlling procedure, although this is not shown in the diagram.

Subsequent operation of the quotient key QK actuates the process previously described, that is, a one-digit shift to the left will be carried out on the contents of the register RC and the judgment will be obtained, through studying the memory steps (not shown in the diagram) in the first control circuit, as to the fact that the quotient key QK has already been operated so that the control of comparison between the data from the registers RA and RB results, as previously described, in a one-digit quotient. Consequently, the display unit DP1 displays "1" already stored in the register RC and "7" just obtained. Thereafter the quotient data displayed sequentially as the quotient key QK is depressed will digitally increase, e.g., "175", "1757", etc., with simultaneous display of the above figures by the display element MD1. When the remainder key RK is then depressed, the calculator starts operating as described previously, and "10" will be displayed together with illumination of the mark "0" of the state-indicator display element MD2.

When the quotient key QK is depressed twice in succession, the display panel DP displays "17571" and "17571·4" in response thereto, and the latter keying operation causes in the comparison circuit CCa the coincidence of the output of the decimal point counter DDC with the decimal point positioning information chosen by the decimal point dial DPS, so that the signal des is generated from the end signal generator ESG which indicates that the division is concluded and the conclusion of the arithmetic operation is indicated to the operator through illumination of the display element MD3.

If the remainder key RK is depressed again, the remainder data of the register RA is displayed as previously described and the coincidence of the decimal point is investigated as previously stated so that the display unit again indicates to the operator that the relevant operation is concluded. Although mode selection is obtained by the change-over key in the above embodiment, it may also be constructed like the numerical key group, to be depressed every time an arithmetic operation is required.

As described above, the present invention is so constructed as not to obtain directly the final result of the division by a single operation and is highly effective for the study of the arithmetic processes.

What we claim is:

1. An electronic calculator comprising:
    means for visualizing calculator presentations:
    input means including means for entering numerals defining operands, means for instructing arithmetic operations between said operands, and means for selectively instructing the display of final calculated results only, and for instructing the display of partial calculated results of a pair of operands by said visualizing means;
    calculating circuitry coupled between said input means and said visualizing means and including means for carrying out arithmetic operations in accordance with the information entered from said input means; and
    control means responsive to the operation of said display instructing means for controlling said calculating circuitry to generate said final and partial calculated results, and for applying the selected calculated results for display on said visualizing means.

2. An electronic calculator according to claim 1 wherein said control means provides one said partial calculated result in response to each operation of said partial result instructing means.

3. An electronic calculator according to claim 1 wherein said control means further provides an accumulation of partial calculated results in response to operation of said partial result instructing means.

4. An electronic calculator according to claim 1 wherein said control means further provides a final calculated result, from said arithmetic operation means, in response to an operation of said partial calculated result instructing means occurring after the control of a final partial calculated result.

5. An electronic calculator according to claim 1 wherein said visualizing means displays a mark in conjunction with each display of a partial calculated result, wherein said mark provides an indication that the display is a partial calculated result.

6. An electronic calculator according to claim 1 wherein said visualizing means displays a mark to distinguish between the display of partial and final calculated results.

7. An electronic calculator according to claim 1 further comprising means for providing an output signal corresponding to the required number of times said partial result instructing means must be operated to obtain a final calculated result, wherein said output signal means sequentially reduces said output signal in response to each operation of said partial result instructing means.

8. An electronic calculator according to claim 7 wherein said visualizing means further comprises means for displaying said output signal.

9. An electronic calculator comprising: means for visualizing calculator presentations; input means including means for entering numerals, means for instructing arithmetic operations, means for selecting between first and second display modes, and display instructing means;
    means for carrying out arithmetic operations in accordance with the information entered by said input means;
    control means coupled between said input means and said arithmetic operations means for controlling the derivation of calculated results from said arithmetic operation means, wherein said operations means provides a final calculated result for display by said visualizing means in response to the operation of said display instructing means when the first output mode is selected by said selecting means, and provides a partial calculated result for display by said visualizing means in response to the operation of said display instructing means when the second output mode is selected by said selecting means.

10. An electronic calculator according to claim 9 wherein said operations means is controlled by said control means to derive one partial calculated result in response to the operation of said display instructing means when the second output mode is selected by said selecting means.

11. An electronic calculator according to claim 9 wherein said operations means is controlled by said control means to derive an accumulation of the partial calculated results in response to said operation of said display instructing means.

12. An electronic calculator according to claim 9 wherein said operations means is controlled by said control means to derive a final calculated result in response to the operation of said display instructing means after the said derivation of all partial calculated results.

13. An electronic calculator according to claim 9 wherein said visualizing means displays a mark in conjunction with each display of a partial calculated result, wherein said mark provides an indication that the display is a partial calculated result.

14. An electronic calculator according to claim 9 wherein said visualizing means displays a mark to distinguish between the displays of partial and final calculated results.

15. An electronic calculator comprising:
    input keyboard means having numeral keys for entering numerals, function keys for effecting arithmetic operations, and an instruction key for controlling the steps of said arithmetic operations;
    means for carrying out arithmetic operations in accordance with the information entered from said input keyboard means to provide a final calculated result;
    control means coupled between said input means and said arithmetic operations means and being responsive to the operation of said instruction key for controlling said operations means to provide partial calculated results of a pair of operands defined by said numerals, wherein sequential partial calculated results are obtained with each sequential operation of said instruction key; and visualizing means, and means for applying the partial results and the final calculated result to said visualizing means for display.

16. An electronic calculator according to claim 15 further comprising means for selecting first and second operation modes, said control means being coupled to said selecting means for controlling the application of data to said visualizing means, wherein when said selecting means designates the first operation mode, the final calculated result is initially displayed, and when said selecting means designates a second operation mode, the final calculated result is displayed subsequent to the display of partial calculated results.

17. An electronic calculator according to claim 15 wherein said control means controls said arithmetic operation means to carry out partial calculations between a first operand and sequential digits of a second operand and to display said partial calculations in response to sequential operations of said instruction key.

18. An electronic calculator according to claim 17 wherein said control means derives an accumulation of said partial calculated results from said operations means for display by said visualizing means when said instruction key is operated.

19. An electronic calculator according to claim 15 wherein said visualizing means displays a mark in conjunction with each display of a partial calculated result, wherein said mark provides an indication that the display is a partial calculated result.

20. An electronic calculator comprising:
input means having numeral keys for entering numerals, function keys for indicating arithmetic operations, an instruction key for controlling the steps of said arithmetic operations, and means for selecting between first and second operation modes;
means for carrying out arithmetic operations in accordance with the information entered by said input means;
arithmetic operation control means coupled between said input means and said operations means for controlling said arithmetic operation means such that when the first operation mode is selected by said selected means, a final calculated result is obtained, and when the second operation mode is selected, a partial calculated result is obtained in response to each operation of said instruction key; and
visualizing means for displaying the partial and final calculated results from said arithmetic operation means.

21. An electronic calculator comprising:
a keyboard having numeral keys for entering numerals, function keys for indicating arithmetic operations, and first and second instruction keys for instructing performance of the operations;
means for carrying out arithmetic operations in accordance with the information entered by said keyboard
control means coupled between said keyboard and said operation means for controlling said arithmetic operations means to provide a final calculated result in response to operation of said first instruction key, and to provide partial calculated results corresponding to a calculation of a first operand and sequential digits of a second operand and in response to every operation of one of said instruction keys;
and visualizing means for displaying said partial calculated and final results from said arithmetic operation means.

22. An electronic calculator according to claim 21, wherein said visualizing means displays a mark to distinguish between the displays of partial and final calculated results.

* * * * *